United States Patent [19]
Centner

[11] 3,768,891
[45] Oct. 30, 1973

[54] AN OPTICAL SYSTEM FOR ATTACHMENT TO A PROJECTOR TO REPRODUCE A SECONDARY IMAGE

[76] Inventor: Herman Centner, 8730 S. W. 21st Terrace, Miami, Fla. 33165

[22] Filed: Mar. 27, 1972

[21] Appl. No.: 238,276

[52] U.S. Cl. .................. 351/30, 353/34, 353/37
[51] Int. Cl.... A61b 3/02, G03b 21/26, G03b 21/28
[58] Field of Search ................... 351/30, 36, 31; 353/21, 34, 37

[56] References Cited
UNITED STATES PATENTS
2,738,702  3/1956  Angenieux ........................ 353/21
3,517,988  6/1970  Schwind .......................... 351/30

*Primary Examiner*—Paul A. Sacher

[57] ABSTRACT

An optical system for use in reproducing a secondary image simultaneously with the main image of a projector. The secondary image is beamed in a direction which is 180° from the path of the beam of light from the projector causing the main image. The secondary image is caused by (a) a mirror arranged in the main beam path to intercept a component of the light, and by converging it to reduce the size of the secondary image and shorten the focal length of the image of the rays forming the secondary image, and (b) a second mirror in the reflected beam to direct the reflected beam onto a screen. Thus, the main beam can be utilized to project the main image to be viewed by a person whose eyes are being tested, while the eye examiner may sit facing the patient to adjust various lenses before his eyes and see the secondary image in front of him which is the same as that which the patient sees.

1 Claim, 2 Drawing Figures

AN OPTICAL SYSTEM FOR ATTACHMENT TO A PROJECTOR TO REPRODUCE A SECONDARY IMAGE

The invention to be described relates to an optical device to be used in conjunction with any projector (slide or motion-picture) in order to produce two screen images from one projector light beam. These two screen images will lie on opposite sides of the projector, and will be an exact likeness of one another, except for size. The advantages of such an arrangement will be made clear in the presentation to follow.

GENERAL FIELD OF THE INVENTION

When a doctor examines eyes for glasses, he usually uses a projector with a slide bearing letters and numbers. Ordinarily, the projected image is on a screen in front of the patient for him to view. Since the doctor faces the patient and not the screen, he cannot see the test characters on this screen unless he turns his head all around. The test characters must be changed often during an eye examination, so that frequent head-turning on the part of the doctor becomes annoying and tiring.

If the doctor, as he faces the patient, were to be able to see a duplicate image in front of him of the projected image behind him, that the patient sees, the examination could proceed much more smoothly and efficiently. Secondly, if the duplicate image that the doctor views contains letters that are orientated correctly from left to right and top to bottom, their legibility will be facilitated. My invention is designed to achieve these two advantages.

An arrangement can be set up to produce a projected image in front of the doctor (slightly to one side) corresponding to the one behind him viewed by the patient. To produce this effect, the single beam of light from the projector is split up to form two images instead of one. Two different optical arrangements are presented to achieve this objective, and are represented in FIGS. 1 and 2 in the accompanying drawings.

DETAILED DESCRIPTION OF THE DRAWINGS

Figure 1:
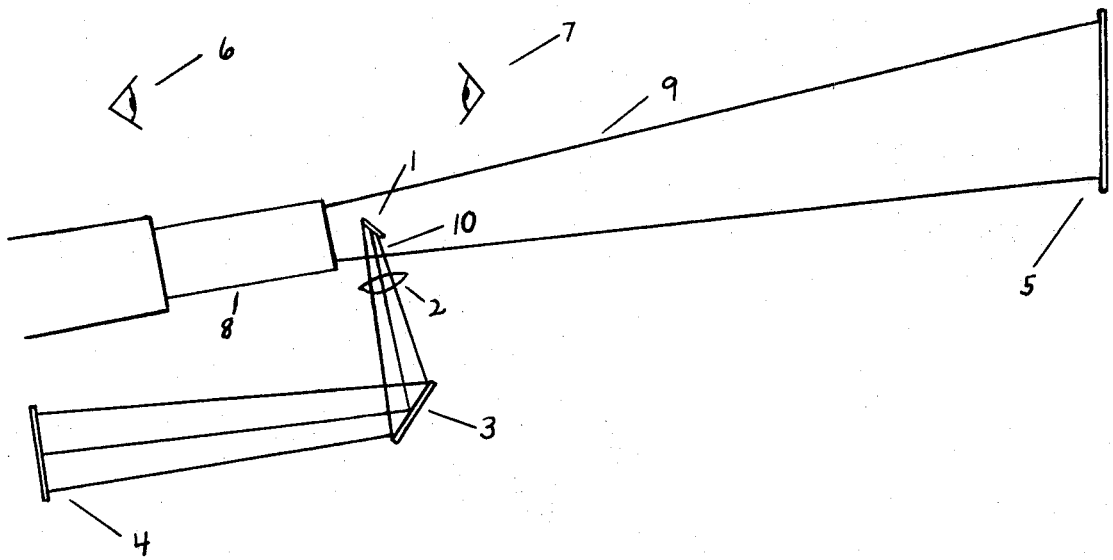
FIG. 1 represents a combination of elements consisting of two opaque, plane mirrors and a convex lens in proper relationship to one another and to the projector's light beam to produce the desired effect of creating two screen images from one light beam.

In FIG. 1, numeral 1 represents a tiny, opaque, plane mirror, numeral 2 represents a tiny convex lens, numeral 3 designates another opaque, plane mirror larger than mirror 1, numeral 4 represents a small screen, and numeral 5 represents a larger screen. The patient's eye is indicated at 6, while the examiner's eye is represented by numeral 7.

The rays of light emitted from the projector tube 8 comprise the primary light beam 9, and serve to form the primary image on screen 5 for the patient to see. The tiny mirror 1, properly angled with respect to the light beam 9, intercepts a small portion of this primary beam, and by reflection forms a secondary beam 10.

The reflected rays of this secondary beam are incident upon the convex lens 2 at a 90° angle. Following refraction through the convex lens, the rays then strike the larger mirror 3, are then reflected, and come to a focus on screen 4. Here the image is viewed by the examiner 7.

The tiny mirror 1, which is much smaller in diameter than that of the beam 9, is situated at the end of the projector tube 8. If the mirror 1 is orientated 45° with the direction of the beam 9, it will reflect part of this beam 10 at right angles to the path of the beam 9. Inasmuch as the light beam 9 is focused for the distant screen 5 in front of the patient, and the projected image to be formed in front of the examiner is less than this distance, a convex lens should also be introduced by placing it at the end of the projector tube, but just outside the primary beam 9. This lens 2 should be orientated perpendicular to the secondary beam 10 reflected from the tiny mirror 1. The refracted rays will converge and come to a focus. If a screen were to be placed at this focal point, an image would be seen, but the test characters would be reversed laterally. The explanation, of course, is that the image would be produced by reflection from a single, plane mirror.

In order to produce a non-reversed image, a second mirror, larger than the first—in order to reflect the incident beam in its entirety—should be set up in such a manner as to intercept the rays of light passing through the converging lens 2. This mirror 3 should make a 45° angle (more or less, depending on the most convenient location of the screen image for the doctor to view) with these rays, and should be orientated so as to reflect these in the direction of the rear of the room, which is in the direction the doctor faces. This larger mirror should not be at the focal point of the rays passing through the lens, but instead in front of the focal point. In this way, the rays, upon reflection from the larger mirror 3, will continue to converge toward its focal point. By moving a screen back and forth in the path of the reflected light, the focal point will be found. It is at this point where the test characters will be most clearly in focus. If the screen 4 is then permanently set up in this position, it will be seen that all images produced thereon will be a clear likeness in reduced size of what the patient 6 sees on screen 5, and the test characters will not be reversed.

It is important to add the following observations:

1. The full width of the light beam 9 from the projector is utilized. The relatively tiny mirror 1 at the end of the projector tube will reflect only part of this beam—a portion of the central rays, to form the final image on screen 4. The remaining unobstructed central and peripheral rays will form the other image on screen 5. Both images, on 4 and 5, are likenesses of one another, and are complete images. The explanation lies in the fact that for every luminous object point there is emitted, not one ray of light, but instead a monocentric bundle of divergent light rays going in all directions. Thus, if some, but not all, of the rays are intercepted, those rays not intercepted are free to continue onward to form an image of the originating point source.

2. It is important that the convex lens 2 be slightly to the side of the projector tube 8, so that it does not intercept the main beam of light 9 from the projector. Its purpose is to intercept only the light reflected from the small mirror 1. Also, the lens 2 should be large enough to intercept the full width of this reflected beam 10.

3. All of the optical elements used are held in place by being mounted in adjustable holders.

Figure 2:
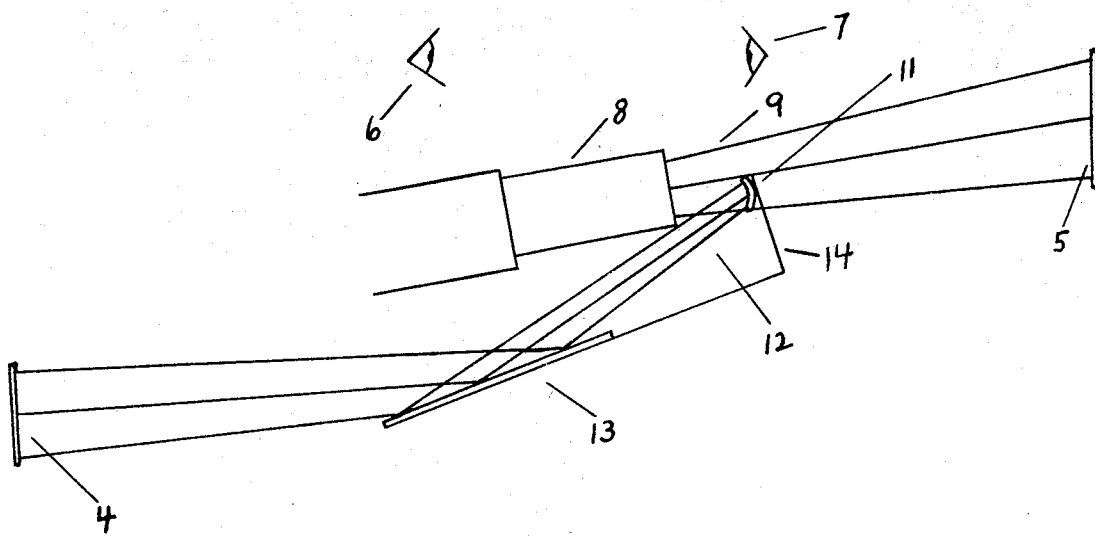
FIG. 2 achieves the same result using only an opaque, concave mirror and an opaque, plane mirror with proper relationship to one another and to the projector's light beam.

FIG. 2 represents a modified optical arrangement designed to achieve the same objective as in FIG. 1, but with fewer component parts. As represented in FIG. 2, a tiny, opaque, concave mirror 11 serves to replace both the plane mirror 1 and the lens 2, shown in FIG. 1. The size of mirror 11 equals that of mirror 1. Its focal length approximately equals that of lens 2. This concave mirror 11 extends into the light beam 9 as far as the optic axis of this beam.

To achieve a non-distorted image on screen 4, it is necessary for the rays reflected from the concave mirror 11 to proceed along a pathway as close as possible to its optic axis, and at the same time bypass with complete clearance the projector tube 8. By carefully rotating mirror 11 only a few degrees from its initial position of being perpendiuclar to the beam 9, this effect is easily achieved.

The reflected rays 12 from the concave mirror 11 are directed toward the plane mirror 13. The two mirrors 11 and 13 are mounted at approximately right angles to each other on holder 14. The rays of light reflected from the concave mirror 11 strike the plane mirror 13 at almost grazing incidence. This plane mirror is large enough in diameter to receive all the rays reflected from the concave mirror 11. Reflection from the plane mirror 13 follows next and is in the form of converging light directed toward screen 4, upon which the image is formed. This image is a duplicate of the image on screen 5, but reduced in size. Also, the letters and numbers are correctly orientated.

In both optical arrangements as represented in FIGS. 1 and 2, there are certain advantages in common:

1. The examiner need not peer into any optical instrument in order to view the image on screen 4, before him, as he faces the patient. In fact, he may view this image from any angle without any restriction as to his position within the room.

2. The optical device can be used as an accessory with any projecting apparatus, since it is not an integral part of that apparatus. Instead, it is used in conjunction with it.

3. Letters and numbers on the screen viewed by the examiner as he faces the patient are clearly defined and correctly orientated.

For the optical design in FIG. 1, well known principles of reflection and refraction are made use of. Originality is claimed only for the particular applications of these principles in designing an optical device for use in the area of eye examinations and related fields.

For the set-up in FIG. 2, while known principles of reflection are utilized, the arrangement wherein light rays reflected from a concave mirror proceed directly to a plane mirror, at almost grazing incidence, is unique.

It is possible to introduce various modifications in the two optical arrangements described without departing from the scope of the inventions.

What is claimed is:

1. An optical system to be used in conjunction with a projector producing a single beam of light to cause a main image, the system being for the purpose of producing a separate secondary screen image from the energy in the main beam, and causing it to appear behind the projector, said system comprising, a first mirror in a position occupying and blocking a small segment of the main beam of the projector and means to hold the first mirror in said position and at an attitude such that the mirror is at an angle relative to the axis of of the beam; light ray convergent means associated with said first mirror to reduce the image and to shorten the focal length of the reflected light beam impinging upon the first mirror; a second mirror in the reflected converged beam of said first mirror and convergent means; a screen located behind the projector; and means to hold the second mirror in the reflected converged beam from the first mirror at an attitude such that a secondary image is reproduced on the screen behind the projector while the primary image is reproduced in front of the projector by rays of the main beam not blocked by the first mirror; and wherein the first mirror and convergent means comprises a concave mirror; and wherein a frame member is provided to support said concave mirror and said second mirror, and to maintain said concave and said second mirror at right angles to one another, and said means to hold said first mirror for arranged such that a portion of said first mirror intercepts the central axis of the main beam from the projector and at an angle of substantially 90° to cause the reflected light to impinge upon the second mirror at grazing incidence.

* * * * *